US012566864B2

(12) United States Patent
Bishop, III et al.

(10) Patent No.: US 12,566,864 B2
(45) Date of Patent: *Mar. 3, 2026

(54) SYSTEM AND METHOD FOR AUTOMATED SECURITY VERIFICATION ACROSS NETWORK DEVICES

(71) Applicant: BANK OF AMERICA CORPORATION, Charlotte, NC (US)

(72) Inventors: Jack Lawson Bishop, III, Evanston, IL (US); Stephen Lloyd Ward, Chicago, IL (US); Robert Eugene Amidon, Mooresville, NC (US); Edward Lee Traywick, Bellbrook, OH (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 166 days.

This patent is subject to a terminal disclaimer.

(21) Appl. No.: 18/386,072

(22) Filed: Nov. 1, 2023

(65) Prior Publication Data

US 2025/0139249 A1     May 1, 2025

(51) Int. Cl.
*G06F 21/57* (2013.01)
*G06F 21/54* (2013.01)
*G06F 21/55* (2013.01)

(52) U.S. Cl.
CPC ............ *G06F 21/577* (2013.01); *G06F 21/54* (2013.01); *G06F 21/554* (2013.01); *G06F 2221/034* (2013.01)

(58) Field of Classification Search
CPC .............................. G06F 21/577; G06F 21/54
See application file for complete search history.

(56) References Cited

U.S. PATENT DOCUMENTS

2020/0257539 A1* 8/2020 Borlick ................. G06N 3/084
2024/0338453 A1* 10/2024 Jabara ................. G06Q 30/018

* cited by examiner

*Primary Examiner* — Pramila Parthasarathy
(74) *Attorney, Agent, or Firm* — Moore & Van Allen PLLC; Nicholas C. Russell

(57) ABSTRACT

Systems, computer program products, and methods are described herein for automated security verification across network devices. The method includes determining a first end-point device configuration of a first end-point device associated with a network. The method also includes determining, via a machine learning model, one or more first end-point device tests based on the first end-point device configuration. The one or more first end-point device tests is based on at least one of the one or more first end-point device programs installed on the first end-point device. The method further includes causing an execution of at least one of the one or more first end-point device tests on the first end-point device. The method still further includes determining a first end-point device validation rating based on the execution of the at least one of the one or more first end-point device tests on the first end-point device.

19 Claims, 5 Drawing Sheets

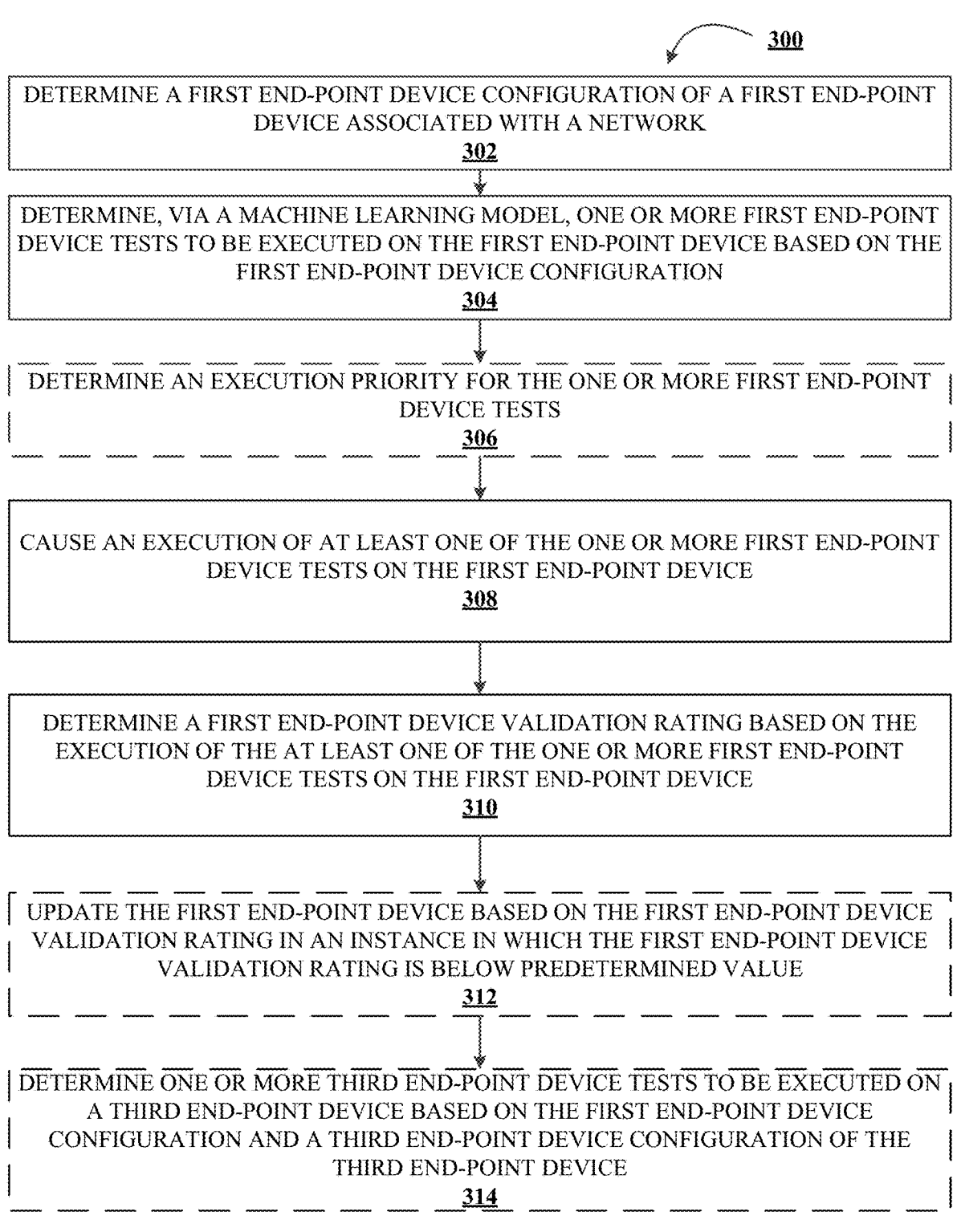

300

DETERMINE A FIRST END-POINT DEVICE CONFIGURATION OF A FIRST END-POINT DEVICE ASSOCIATED WITH A NETWORK
302

DETERMINE, VIA A MACHINE LEARNING MODEL, ONE OR MORE FIRST END-POINT DEVICE TESTS TO BE EXECUTED ON THE FIRST END-POINT DEVICE BASED ON THE FIRST END-POINT DEVICE CONFIGURATION
304

DETERMINE AN EXECUTION PRIORITY FOR THE ONE OR MORE FIRST END-POINT DEVICE TESTS
306

CAUSE AN EXECUTION OF AT LEAST ONE OF THE ONE OR MORE FIRST END-POINT DEVICE TESTS ON THE FIRST END-POINT DEVICE
308

DETERMINE A FIRST END-POINT DEVICE VALIDATION RATING BASED ON THE EXECUTION OF THE AT LEAST ONE OF THE ONE OR MORE FIRST END-POINT DEVICE TESTS ON THE FIRST END-POINT DEVICE
310

UPDATE THE FIRST END-POINT DEVICE BASED ON THE FIRST END-POINT DEVICE VALIDATION RATING IN AN INSTANCE IN WHICH THE FIRST END-POINT DEVICE VALIDATION RATING IS BELOW PREDETERMINED VALUE
312

DETERMINE ONE OR MORE THIRD END-POINT DEVICE TESTS TO BE EXECUTED ON A THIRD END-POINT DEVICE BASED ON THE FIRST END-POINT DEVICE CONFIGURATION AND A THIRD END-POINT DEVICE CONFIGURATION OF THE THIRD END-POINT DEVICE
314

FIGURE 3

SYSTEM AND METHOD FOR AUTOMATED SECURITY VERIFICATION ACROSS NETWORK DEVICES

TECHNOLOGICAL FIELD

Example embodiments of the present disclosure relate generally to application security and information security and, more particularly, to automated security verification across network devices.

BACKGROUND

Security testing is often conducted across multiple different devices. However, one size fits all security posture validation approaches create issues with different devices, as different installed applications may need different tests to be conducted in order to validate security compliance for a given device. Many of these identified problems have been solved by developing approaches that are included in embodiments of the present disclosure.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for automated security verification across network devices is provided. The system includes at least one non-transitory storage device containing instructions and at least one processing device coupled to the at least one non-transitory storage device. The at least one processing device, upon execution of the instructions, is configured to determine a first end-point device configuration of a first end-point device associated with a network. The first end-point device configuration includes one or more first end-point device programs installed on the first end-point device. The at least one processing device, upon execution of the instructions, is also configured to determine, via a machine learning model, one or more first end-point device tests to be executed on the first end-point device based on the first end-point device configuration. The one or more first end-point device tests is based on at least one of the one or more first end-point device programs installed on the first end-point device. The at least one processing device, upon execution of the instructions, is further configured to cause an execution of at least one of the one or more first end-point device tests on the first end-point device. The at least one processing device, upon execution of the instructions, is still further configured to determine a first end-point device validation rating based on the execution of the at least one of the one or more first end-point device tests on the first end-point device.

In various embodiments, the machine learning model determines the one or more first end-point device tests based on a weighing of the one or more first end-point device programs installed on the first end-point device.

In various embodiments, the at least one processing device, upon execution of the instructions, is also configured to determine an execution priority for the one or more first end-point device tests with the execution priority indicating an order of execution for the one or more first end-point device tests. In various embodiments, the execution of the at least one of the one or more first end-point device tests is based on the execution priority.

In various embodiments, the determination of the at least one of the one or more first end-point device tests is also based on a second end-point device configuration of a second end-point device with the second end-point device configuration having at least one common program with the first end-point device configuration.

In various embodiments, at least one of the one or more first end-point device tests is determined based on a first end-point device security setting.

In various embodiments, the at least one processing device, upon execution of the instructions, is also configured to determine one or more third end-point device tests to be executed on a third end-point device based on the first end-point device configuration and a third end-point device configuration of the third end-point device.

In various embodiments, the at least one processing device, upon execution of the instructions, is also configured to update the first end-point device based on the first end-point device validation rating in an instance in which the first end-point device validation rating is below predetermined value with updating the first end-point device including modifying at least one of the one or more first end-point device programs.

In another example embodiment, a computer program product for automated security verification across network devices is provided. The computer program product includes at least one non-transitory computer-readable medium having computer-readable program code portions embodied therein. The computer-readable program code portions include one or more executable portions configured to determine a first end-point device configuration of a first end-point device associated with a network. The first end-point device configuration includes one or more first end-point device programs installed on the first end-point device. The computer-readable program code portions include one or more executable portions also configured to determine, via a machine learning model, one or more first end-point device tests to be executed on the first end-point device based on the first end-point device configuration. The one or more first end-point device tests is based on at least one of the one or more first end-point device programs installed on the first end-point device. The computer-readable program code portions include one or more executable portions further configured to cause an execution of at least one of the one or more first end-point device tests on the first end-point device. The computer-readable program code portions include one or more executable portions still further configured to determine a first end-point device validation rating based on the execution of the at least one of the one or more first end-point device tests on the first end-point device.

In various embodiments, the machine learning model determines the one or more first end-point device tests based on a weighing of the one or more first end-point device programs installed on the first end-point device.

In various embodiments, the computer-readable program code portions include one or more executable portions also configured to determine an execution priority for the one or more first end-point device tests with the execution priority indicating an order of execution for the one or more first end-point device tests. In various embodiments, the execution of the at least one of the one or more first end-point device tests is based on the execution priority.

In various embodiments, the determination of the at least one of the one or more first end-point device tests is also based on a second end-point device configuration of a second end-point device with the second end-point device configuration having at least one common program with the first end-point device configuration.

In various embodiments, at least one of the one or more first end-point device tests is determined based on a first end-point device security setting.

In various embodiments, the computer-readable program code portions include one or more executable portions also configured to determine one or more third end-point device tests to be executed on a third end-point device based on the first end-point device configuration and a third end-point device configuration of the third end-point device.

In various embodiments, the computer-readable program code portions include one or more executable portions also configured to update the first end-point device based on the first end-point device validation rating in an instance in which the first end-point device validation rating is below predetermined value with updating the first end-point device including modifying at least one of the one or more first end-point device programs.

In still another example embodiment, a method for automated security verification across network devices is provided. The method includes determining a first end-point device configuration of a first end-point device associated with a network. The first end-point device configuration includes one or more first end-point device programs installed on the first end-point device. The method also includes determining, via a machine learning model, one or more first end-point device tests to be executed on the first end-point device based on the first end-point device configuration. The one or more first end-point device tests is based on at least one of the one or more first end-point device programs installed on the first end-point device. The method further includes causing an execution of at least one of the one or more first end-point device tests on the first end-point device. The method still further includes determining a first end-point device validation rating based on the execution of the at least one of the one or more first end-point device tests on the first end-point device.

In various embodiments, the machine learning model determines the one or more first end-point device tests based on a weighing of the one or more first end-point device programs installed on the first end-point device.

In various embodiments, the method also includes determining an execution priority for the one or more first end-point device tests with the execution priority indicating an order of execution for the one or more first end-point device tests. In various embodiments, the execution of the at least one of the one or more first end-point device tests is based on the execution priority.

In various embodiments, the determination of the at least one of the one or more first end-point device tests is also based on a second end-point device configuration of a second end-point device with the second end-point device configuration having at least one common program with the first end-point device configuration.

In various embodiments, at least one of the one or more first end-point device tests is determined based on a first end-point device security setting.

In various embodiments, the method also includes determining one or more third end-point device tests to be executed on a third end-point device based on the first end-point device configuration and a third end-point device configuration of the third end-point device.

In various embodiments, the method also includes updating the first end-point device based on the first end-point device validation rating in an instance in which the first end-point device validation rating is below predetermined value with updating the first end-point device including modifying at least one of the one or more first end-point device programs.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
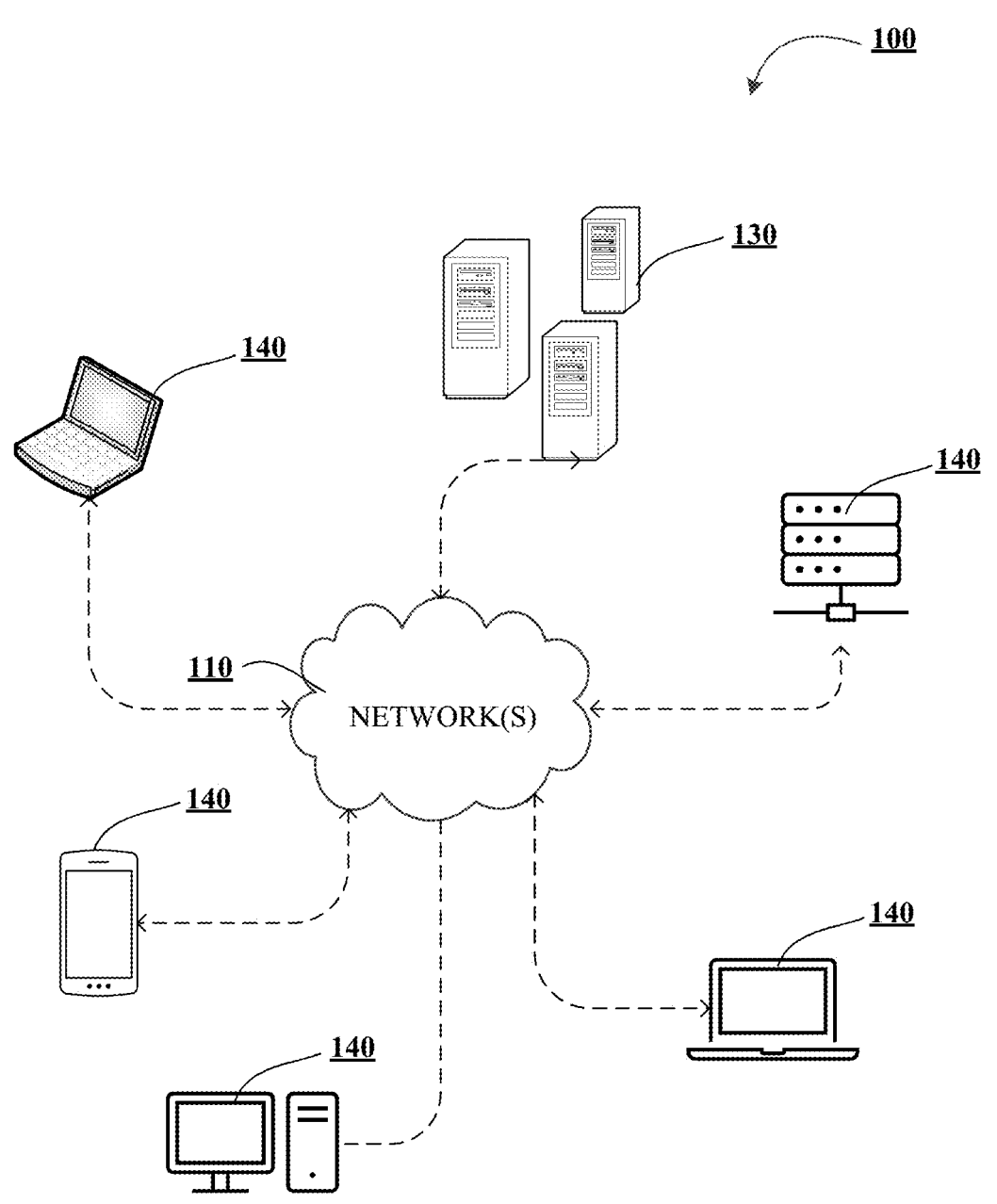
Figure 1B:
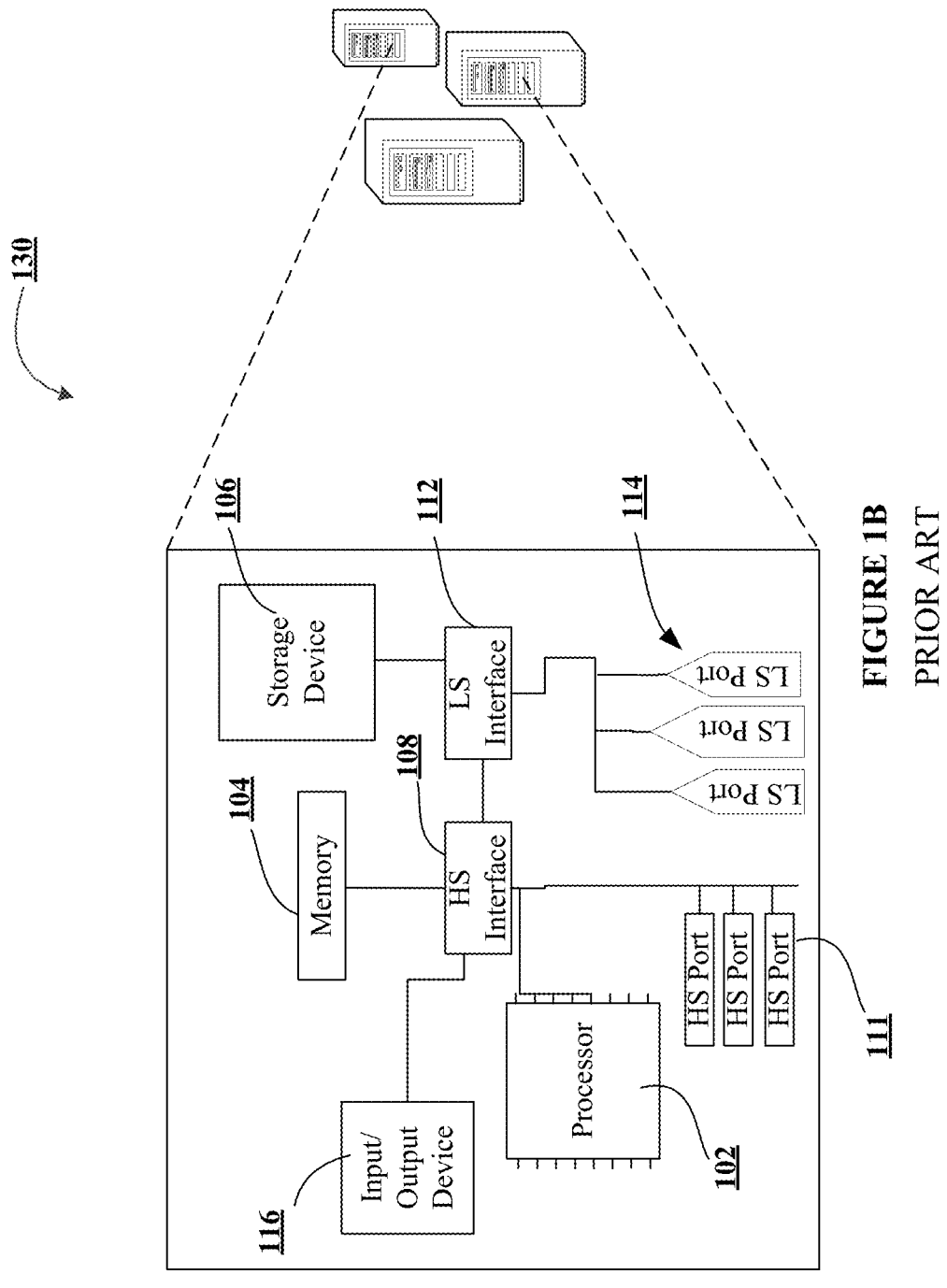
Figure 1C:
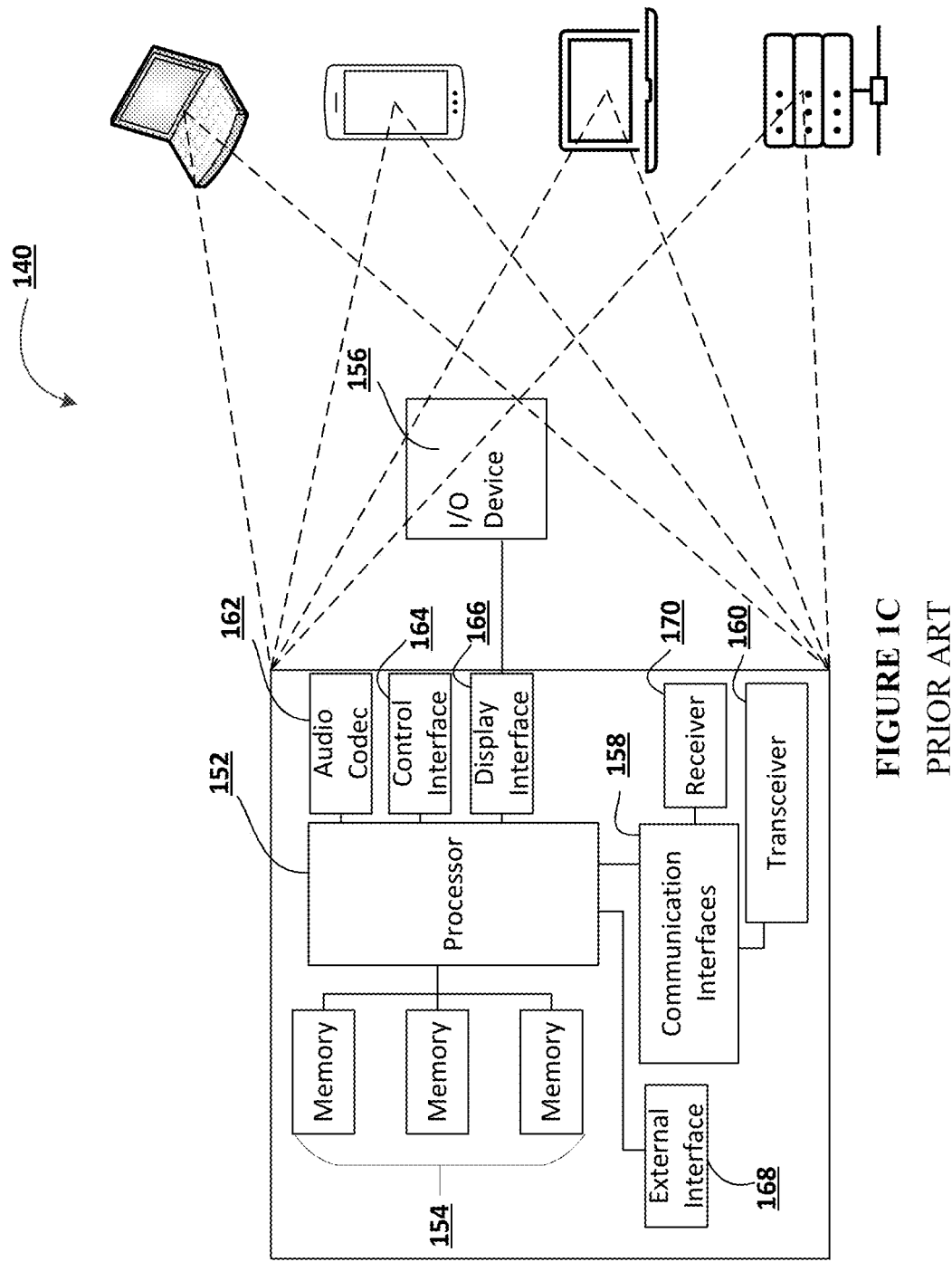
Figure 2:
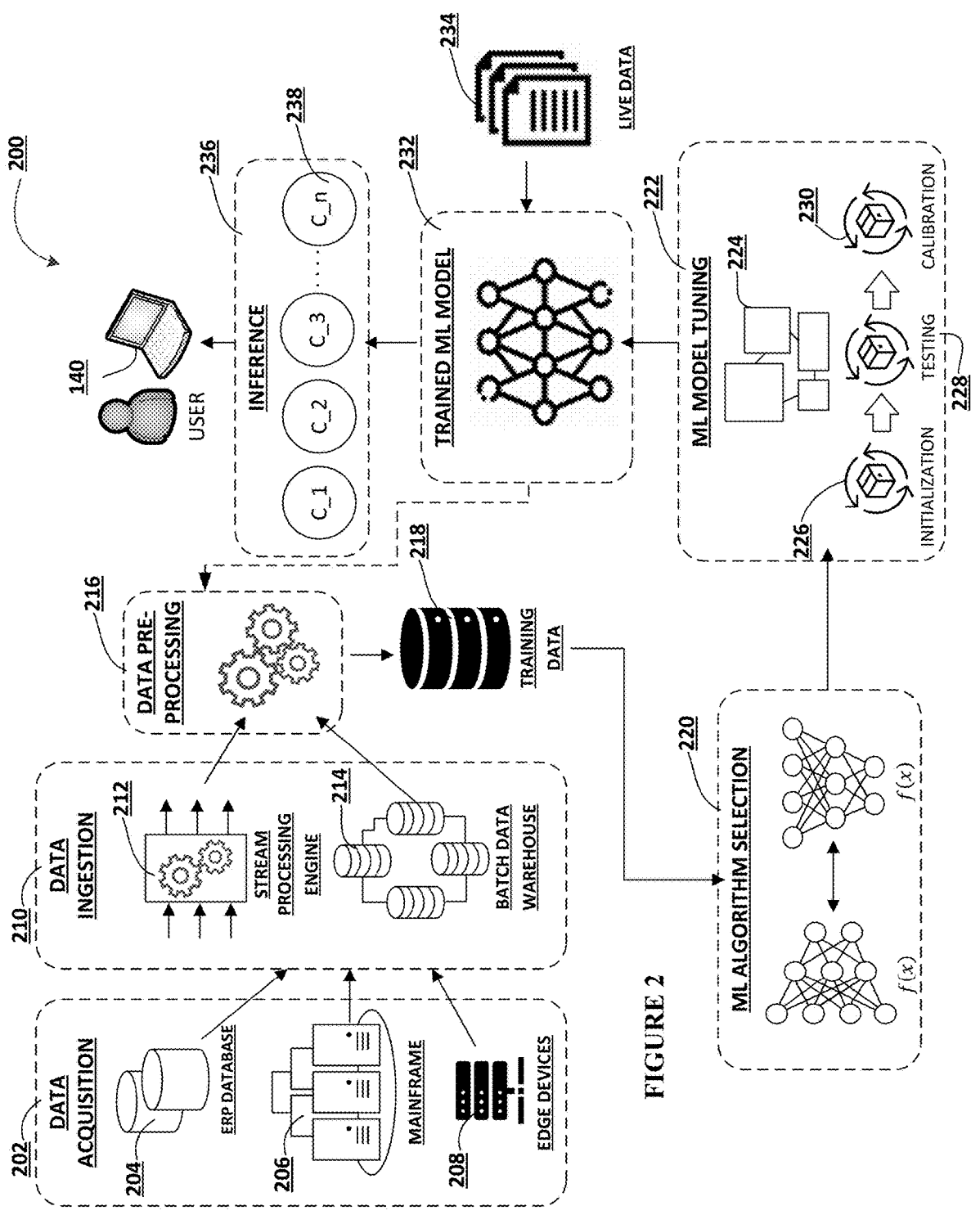

FIGS. 1A-1C illustrate technical components of an example distributed computing environment for automated security verification across network devices, in accordance with various embodiments of the present disclosure;

FIG. 2 illustrates an example machine learning (ML) subsystem architecture 200 used in accordance with various embodiments of the present disclosure; and FIG. 3 illustrates a process flow for automated security verification across network devices, in accordance with various embodiments of the present disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data. An "entity" can encompass a wide range of organizations, such as institutions, groups, associations, financial institutions, establishments, companies, unions, authorities, and similar entities. The common factor among these entities is their utilization of information technology resources for processing substantial amounts of data. As such, an "entity" in this context denotes any organization or institution that employs information technology resources capable of processing large volumes of data, which can pertain to different aspects of the entity's operations.

As described herein, a "user" may be an individual associated with an entity. As such, in some embodiments, the user may be an individual having past relationships, current relationships or potential future relationships with an entity (e.g., a customer at a financial institution). A user may also, in some embodiments, be an automated process effecting the same behaviors as an individual user. For example, an artificial intelligence engine may be used to execute actions that simulate or otherwise imitate a user.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device. Additionally, as used herein, a "resource" may also encompass computing or network resources. This broader definition of a resource includes elements such as computational power, storage capacity, network bandwidth, software applications, databases, virtual machines, servers, routers, switches, and other similar components associated with computing or network infrastructure.

As used herein, an "artificial intelligence" (AI) system is a computing framework designed to perform tasks that normally require human intelligence, such as understanding natural language, recognizing patterns, problem-solving, and making decisions. It is understood that these systems operate by mimicking the neural networks of humans in a simplified form. In some embodiments, they may consist of interconnected layers of nodes, often referred to as artificial neurons, that process information using dynamic state responses to external inputs. They are trained by feeding them large volumes of data and adjusting the connections between the nodes using complex mathematical algorithms based on the principles of statistics and calculus, allowing them to learn from this data. In some embodiments, an AI system may be stored and executed in various ways depending on the requirements of the specific implementation. It is understood that AI systems can be hosted on local machines, in data centers, or in the cloud. It is further understood that cloud-based AI systems are becoming increasingly common due to their scalability, cost-effectiveness, and the ability to handle vast amounts of data. AI systems may be employed for identifying data patterns and vulnerability vectors due to their ability to analyze large and complex datasets rapidly and accurately.

As used herein "machine learning" (ML), a subset of AI, may be utilized in some embodiments. ML algorithms learn from the data they process, enabling them to discover hidden insights and patterns that may not be apparent to human analysts. For instance, in cybersecurity, AI systems can analyze network traffic to identify patterns consistent with cyber threats or vulnerabilities, providing an effective tool for proactively safeguarding systems and data. It is understood that there are several types of ML algorithms, each suited to different types of tasks. These include supervised learning where the algorithm learns from labeled training data, and then applies what it has learned to new data. In further embodiments, unsupervised learning may employ unlabeled data and learn by identifying patterns and structures within it. Additionally, in some embodiments, reinforcement learning may involve an algorithm that learns by interacting with its environment and receives rewards or demerits based on its actions. Furthermore, semi-supervised learning may include a blend of supervised and unsupervised learning wherein various embodiments of the present disclosure employ the use of an algorithm which learns from a small amount of labeled data supplemented by a large amount of unlabeled data. Particularly regarding cybersecurity, ML may be used to identify patterns consistent with cyber vulnerabilities. This proactive approach to cybersecurity allows vulnerabilities to be detected and mitigated early, reducing the potential damage they may cause. In some embodiments, ML may provide valuable insights and automated decision-making capabilities across multiple entity communication channels.

Networks often need to implement security testing across network devices for security and/or efficiency purposes. However, such testing is typically only tested on limited amounts of devices, leaving other devices on the network to be untested for the test before actual deployment. As such, testing can cause hardware and/or software on the network to break and/or otherwise result in decreased performance. Additionally, different device configurations may require different testing for desired security, either resulting in inefficiencies (e.g., testing being conducted across devices that don't need the given test to be secure) and/or security vulnerabilities (e.g., certain tests that need to be completed on one or more device configuration may not be completed). There is little to be done that allows for a test kit to be tested and/or deployed across every device on a network. A large network can have any number of connected devices with each connected device having any combination of applications. As such, security and/or other network testing present a large security threat to network operations, as well as potential harm to both software operations and the underlying hardware. As such, the present disclosure improves the deployment and operations of device testing.

Various embodiments of the present disclosure allow for automated security verification across network devices. To do this, the system provides for customized test kits for individual end-point devices on a network. As such, the system determines the device configuration for a given end-point device on the network. Based on the device configuration, using machine learning model(s), the system determines a test kit (e.g., one or more end-point device tests) to be performed on the given end-point device. The tests customized for the given end-point device are caused to be executed and an end-point device validation rating can be determined that indicates the security level for the given end-point device. The given end-point device may be updated and/or otherwise modified in an instance in which the end-point device validation rating is below a threshold value. As such, end-point device testing is improved, which results in improved network security.

FIGS. 1A-1C illustrate technical components of an example distributed computing environment for automated security verification across network devices, in accordance with an embodiment of the disclosure. As shown in FIG. 1A, the distributed computing environment 100 contemplated herein may include a system 130 (e.g., a network monitoring device), an end-point device(s) 140, and a network 110 over which the system 130 and end-point device(s) 140 communicate therebetween. In various embodiments, the system 130 may be embodied by one or more of the end-point devices 140. As such, any end-point device 140 may operate as the system 130.

FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, or any other auxiliary network devices, mainframes, or the like, or any combination of the aforementioned.

The end-point device(s) 140 may represent various forms of digital computing devices, such as laptops, desktops, cellular telephones, smartphones, video recorders, audio/video players, radios, workstations, or the like, or any other auxiliary network devices, such as wearable devices, personal digital assistants, Internet-of-things devices, electronic kiosk devices, Operational Technology (OT) devices, or the like, or any combination of the aforementioned. End-point devices may also include merchant input devices such as point-of-sale (POS) devices, electronic payment kiosks, electronic telecommunications device (e.g., automated teller machine (ATM)), or the like, or any combination of the aforementioned. End-point devices may also include edge devices such as routers, routing switches, integrated access devices (IAD), and/or the like, or any combination of the aforementioned.

The network 110 may be a distributed network that is spread over different networks. This provides a single data communication network, which can be managed jointly or separately by each network. In addition to the shared communication within the network, the distributed network often also supports distributed processing. The network 110 may be a form of digital communication network such as a telecommunication network, a local area network ("LAN"), a wide area network ("WAN"), a global area network ("GAN"), the Internet, a satellite network, a cellular network, and/or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an example component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 (shown as "HS Interface") connecting to the memory 104, and a low-speed interface 112 (shown as "LS Interface") connecting to low-speed expansion port 114 (shown as "LS Port") and storage device 106. Each of the components 102, 104, 106, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer-readable or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an example component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an example machine learning (ML) architecture 200, in accordance with an embodiment of the present disclosure. The ML subsystem architecture may be part of the components of the environment 100 (e.g., end-point device(s) 140). The ML subsystem architecture is used to determine end-point device tests to be performed on end-point devices on a network as discussed below in reference to FIG. 3. Namely, the ML subsystem architecture may be used to train the system to determine the similarities between configurations of end-point devices and/or determine similar end-point devices.

The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the data sources 204, 206, and 208 may include various databases relating to the network, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making predictions about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

FIG. 3 illustrates a process flow for automated security verification across network devices, in accordance with various embodiments of the present disclosure. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. Additionally, ML/AI may also be used, such the AI/ML discussed in reference to FIG. 2.

In various embodiments, one or more of the end-point devices 140 associated with the network may be capable of executing one or more features of the process flow discussed herein. As such, each of the one or more of the end-point devices 140 associated with the network may include hardware to carry out the operations herein. Additionally, as discussed herein, various software programs and/or applications may be installed on a given end-point device to conduct the operations discussed herein.

In various embodiments, the first end-point device, second end-point device, third end-point device, etc. may refer to any of the end-point device on the network. As such, the operations discussed herein may be completed on any of the end-point devices on the network (e.g., unique test kits may be determined and caused to be executed for multiple different end-point devices on the network).

Referring now to Block 302 of FIG. 3, the method includes determining a first end-point device configuration of a first end-point device associated with a network. The end-point device configuration for a given end-point device may include any programs installed, accessed, and/or otherwise used by the given end-point device. In various embodiments, the term program and application may be used interchangeably herein. In various embodiments, the end-point device configuration for a given end-point device is obtained automatically (e.g., as discussed herein, a program may be installed on or otherwise have access to the end-point device to determine the configuration).

The end-point device configuration may also include other information relating to the given end-point device, such as metadata relating to the end-point device, account information for any user(s) associated with the given end-point device, security settings and/or permissions, and/or the like. Such additional information may be used in the operations discussed herein. For example, the security setting and/or permission of the given end-point device and/or a user associated with the given end-point device may cause different tests to be included in the test kit for the given end-point device.

Additionally, the ML/AI model(s) may use such information to determine similar configurations (e.g., an end-point device with a similar hardware/software/network configuration and the same security setting may result in better tailored test kit for the given end-point device than another end-point device with a similar configuration, but vastly different security settings). As discussed below in reference to Block 304, the ML/AI model(s) may determine the test kit for a given end-point device based on the test kit of similar configured end-point devices. In such an example, differently configured end-point devices (e.g., end-point devices with different programs installed) may have different tests included in the test kit for the given end-point device than other end-point devices.

In various embodiments, the first end-point device configuration of the first end-point device may be determined via a program installed on the first end-point device and/or other software program used to detect any programs installed, used, and/or otherwise accessed on the first end-point device. In various embodiments, the configuration of various end-point devices on the network may be determined in the same manner as the first end-point device configuration of the first end-point device is determined. For example, the system may determine a second end-point device configuration of the second end-point device, a third end-point device configuration of the third end-point device, and/or the like. As such, any number of end-point device configurations may be determined using the methods discussed herein. Additionally various end-point device configurations may be compared for determination of tests to be executed on a given end-point device.

Referring now to Block 304 of FIG. 3, the method includes determining, via a machine learning model, one or more first end-point device tests to be executed on the first end-point device based on the first end-point device configuration. An end-point device test may be any test or operation that may be performed on an end-point device relating to device operability and/or health (e.g., component heat, component usage, overall usage, network operability, and/or the like), network operability and/or health (e.g., the effect of the given end-point device on the network and/or the effect of the network operations on the given end-point device), program specific operability and/or health, end-point device security (e.g., security settings, network configuration, operating system configuration, program security, file security, data security, and/or the like), and/or the like. A given end-point device test may be performed on one or more programs installed and/or otherwise accessed by the given end-point device and/or the entire end-point device (e.g., a test may screen specific program files and/or all files on the end-point device). As discussed herein, the end-point device test(s) for a given end-point device may be based on the end-point device test(s) performed on a similarly configured end-point device.

In various embodiments, the tests may monitor and/or otherwise record device metric(s) for the given end-point device. Example, device metric(s) may be any metrics associated with the operations of the end-point device, such as processing usage, component heat, network usage, component speed, network speed, and/or the like. Device metric (s) may also include information relating to network and/or end-point device vulnerability. Such device metrics may also be used (e.g., by the ML/AI model(s)) to determine similarities between configurations of end-point devices. For example, end-point devices with similar configurations may have similar metric values (e.g., a given end-point device may have the same network usage as a similarly configured end-point device). As such, the device metric(s) may be used to determine similarly configured end-point device.

The one or more first end-point device tests may also be referred to as a first end-point device test kit. As such, a test kit (e.g., a first end-point device test kit, a second end-point device test kit, a third end-point device test kit, etc.) may include one or more tests to be executed on the given end-point device. The test kit (e.g., the first end-point device test kit) may be based on at least one of the one or more first end-point device programs installed on the first end-point device.

In various embodiments, specific program(s) being installed or otherwise used by an end-point device may result in one or more tests being included in the test kit for the given end-point device (e.g., a security screening test may be needed for programs that involve processing of specific data). Additionally and/or alternatively, combinations of programs may cause one or more tests to be included in the test kit for the given end-point device. For example, a first program and a second program may often be used in combination to process specific data and certain tests may be caused to be executed in order to protect the given end-point device.

In various embodiments, the end-point device test kits (e.g., the first end-point device test kit, the second end-point device test kit, the third end-point device test kit, etc.) may be determined via ML/AI model(s), such as the ML/AI model(s) discussed above in reference to FIG. 2. In various embodiments, the ML/AI model(s) may determine the test kit for a given end-point device (e.g., the first end-point device) based on a weighing of the one or more end-point device programs installed on the given end-point device. For example, some programs may have higher usages by an end-point device (e.g., email program may be used more than other programs) and/or some programs may transmit or otherwise interact with more sensitive data than other programs.

In various embodiments, the test kit for a given end-point device may be based on one or more additional end-point devices on the network. For example, the determination of the at least one of the one or more first end-point device tests may be also based on a second end-point device configuration of a second end-point device. In such an example, the second end-point device configuration may have at least one common program with the first end-point device configuration.

As such, the ML/AI models may determine the test kit for a given end-point device based on the test kit of similar configured end-point devices. In such an example, differently configured end-point devices (e.g., end-point devices with different programs installed) may have different tests included in the test kit for the given end-point device.

In various embodiments, the ML/AI model(s) may be configured to determine end-point device groups in which similarly configured end-point devices and group such similarly configured end-point devices together. The determination of a grouping of end-point devices may be based on a predetermined amount of similarity. For example, end-point devices that share a predetermined percentage of programs installed and/or other configuration similarities may be grouped together and receive the same test kit. In various embodiments, each end-point device in a given group may receive the same test kit (e.g., a grouping of end-point devices may have a different test kit from other groupings). Alternatively, a group may have a preset test kit that can be further customized for a given end-point device. For example, an end-point device may have a similar configuration to other end-point devices in the group, but also have one or more different programs installed that cause additional tests to be needed for the given end-point device.

In various embodiments, the test kit for a given end-point device may be determined based on a security setting of the given end-point device. For example, at least one of the one or more first end-point device tests may be determined based on a first end-point device security setting. Security setting may indicate a level of security required for the given end-point device. Such a security setting may be set by the given end-point device or the network administrators (e.g., an end-point device processing sensitive information may have a higher security setting). As such, the tests performed may be different based on the security setting. For example, one or more tests may always be performed on end-point device with a specific security setting (e.g., the tests may be required by the network and/or by law to protect data).

As discussed herein, the end-point device test(s) for a given end-point device may be determined using ML/AI model(s). The ML/AI model(s) may be trained and/or updated as discussed herein (e.g., using the ML architecture discussed in reference to FIG. 2). In various embodiments, at least a portion of the ML/AI model(s) may be stored locally on one or more of the end-point device. Additionally or alternatively, at least a portion of the ML/AI model(s) may be stored on a system remote from the end-point devices (e.g., system 130), and/or the like. The machine learning model and/or an AI model may also be used to compare the end-point device configurations for a plurality of end-point devices to determine similar end-point devices. Additionally, the ML/AI model(s) may determine test(s) necessary and/or desired for an end-point device based on one or more programs installed and/or otherwise used by the given end-point device. For example, the ML/AI model(s) may be trained using tests executed on other end-point devices (e.g., either using the operations herein and/or other methods, such as a manual tests conducted by a network administrator). As such, the ML/AI model(s) may be trained and/or updated as discussed in reference to FIG. 2.

In various embodiments, the method includes training a machine learning model and/or an AI model to determine similarities between configurations of end-point devices. For example, known overlapping device programs for multiple end-point devices may be used as a training set to teach the ML/AI model(s). The ML/AI model(s) may then be trained using this information to determine similar end-point devices from a plurality of end-point devices.

In various embodiments, the method includes updating a machine learning model and/or an AI model to determine the similarities between configurations of end-point devices. The results of tests and/or outside information relating to device health may be used to update the ML/AI model(s). As such, the results of the operations here are used to improve the ML/AI model(s) for future operations.

Referring now to optional Block 306 of FIG. 3, the method includes determining an execution priority for the one or more first end-point device tests. The execution priority indicates an order of execution for the test in a test kit for a given end-point device. For example, the one or more first end-point device tests may have an order of execution for the first end-point device.

In various embodiments, the execution priority may indicate at least a partial hierarchy among one or more tests in a given test kit. For example, some tests may be performed before another, prioritized over others (in an instance in which not every test may be performed), and/or other ordered. The execution priority may be based on the program (e.g., type of data being processed, type of user access, etc.).

In various embodiments, the execution priority may indicate one or more preferred tests of the end-point device test(s) for the given end-point device. Preferred test(s) may be prioritized over other test(s), such as an instance in which there are restraints on the ability to perform every test. For example, test(s) may be time sensitive and/or the system may only be able to execute test(s) during certain hours. As such, the preferred test(s) may be run before other test(s) in an instance in which all test(s) for a given end-point device can be completed, or instead of the other test(s) in an instance in which all test(s) for a given end-point device cannot be completed. In various embodiments, one or more tests may be de-prioritized in an instance in which previous test results preclude the need to run the given test(s). For example, a successful or failed test result of the test or another test may reduce and/or negate the need for a given test to be executed.

In various embodiments, the execution of one or more tests of the test kit for a given end-point device may be based on the execution priority. For example, the order of execution of the first end-point device tests on the first end-point device may be determined based on the execution priority. In various embodiments, the execution priority may cause one or more tests of the given test kit to be prioritized above other test(s) of the given test kit. Prioritizing test(s) may include causing the prioritized test to be performed before other tests in the test kit and/or prioritized test result(s) to be given more weight in the determination of the validation rating for the given end-point device.

Referring now to Block 308 of FIG. 3, the method includes causing an execution of at least one of the one or more first end-point device tests on the first end-point device. The execution of the test(s) may be caused by the end-point device (e.g., the end-point device executes the test(s)) and/or by the system (e.g., the system may remotely cause the end-point device to execute the test(s)). The one or more first end-point device tests may be caused to be transmitted to the first end-point device. In various embodiments, the first end-point device test(s) are downloadable by the first end-point device (e.g., the system may provide the first end-point device with the location of the tests and/or the tests to be executed on the given end-point device). For example, one or more tests for end-point devices may be stored in one or more central repository and/or databases such that various end-point devices may download and/or otherwise access the test(s). In such an example, the system may provide the one or more tests to be executed on the given end-point device and the end-point device may then retrieve the tests indicated by the system (e.g., the first end-point device may retrieve the first end-point device test(s)).

The end-point device test(s) for a given end-point device may then be executed on the given end-point device and the results may be stored and/or transmitted in order to be processed (e.g., to determine the validation rating for the given end-point device). The results of the end-point device test(s) may be stored locally on the given end-point device and/or remotely (e.g., a central memory database associated with the system 130). In various embodiments, the raw data relating to the end-point device test(s) may be transmitted to the system for processing (e.g., the system may determine the validation rating and/or individual validation rating(s) based on the raw data).

Referring now to Block 310 of FIG. 3, the method includes determining a first end-point device validation rating based on the execution of the at least one of the one or more first end-point device tests on the first end-point device. The validation rating for an end-point device (e.g., a first end-point device validation rating for the first end-point device) may indicate the level of security for the given end-point device. The validation rating is based on the results of one or more of the test(s) executed on the given end-point device (e.g., the device metric(s) from a given test may be compared to a standard and/or expected value). In various embodiments, each test may be given equal weight. Alternatively, different tests may be given different weights (e.g., the weight of the tests may be based on the execution priority).

In various embodiments, the validation rating for a given end-point device indicates whether any changes to the end-point device are necessary. In various embodiments, the validation rating may be binary (e.g., an end-point device may either pass or fail). Alternatively, the validation rating may be non-binary (e.g., the validation rating may be numerical or containing multiple different possible categories). Alternatively, the validation rating may be non-binary (e.g., numerical value from 0-100) and the validation rating may include a threshold value that determines whether the validation rating is passing or failing. In various embodiments, such a threshold value may be determined by the system (e.g., via the AI/ML model(s) discussed herein) and/or manually (e.g., by a network administrator).

Individual end-point device tests may have individual validation ratings that indicate the results of the given end-point device test. For example, each test may have a threshold or other standard to determine an instance in which the given end-point device passes or fails the given test. The end-point validation rating for a given end-point device may be determined based on the one or more individual validation ratings of the individual end-point device tests. The individual validation ratings may be combined in order to determine an end-point validation rating (e.g., the individual validation rating may be averaged with each individual end-point validation rating receiving a weight, either equal or different weights).

In various embodiments, the end-point validation rating for a given end-point device may be determined based on a threshold number of individual validation ratings indicating a passed test. For example, the end-point validation rating may indicate a pass validation rating for an end-point device that passes 9 out of 10 tests. In various embodiments, the amount of passing individual validation ratings may be based on the settings of the device. For example, a higher desired security level may result in more passed tests to indicate that the end-point validation rating is a pass. In various embodiments, one or more tests for an end-point device may be designated as critical, such that an instance that the test is failed by an end-point device, the end-point validation rating would automatically result in a failure.

While the validation rating and individual validation ratings are discussed in terms of pass and fail, various embodiments may use various non-binary ratings that may be used as discussed herein with the binary ratings. For example, a rating may need to obtain a threshold value of a non-binary validation rating to indicate a pass rating.

In various embodiments, in an instance in which the end-point validation rating is pass (e.g., the validation rating is above the threshold value), the system may provide a confirmation to the network that an end-point device has a passing validation rating. The test kit for an end-point device may be updated periodically and/or the tests may be executed periodically to confirm that the validation rating has increased or not changed, and/or the validation has improved (e.g., in an instance in which the validation rating was low during previous testing).

Referring now to optional Block 312 of FIG. 3, the method includes updating the first end-point device based on the first end-point device validation rating in an instance in which the first end-point device validation rating is below predetermined value. As discussed above, the same operations may also be completed on other end-point devices associated with the network (e.g., a second end-point device, a third end-point device, etc.) In various embodiments, updating the first end-point device may include modifying at least one of the one or more first end-point device programs for the first end-point device. The modification of the at least one of the one or more first end-point device programs may be based on the results of one or more of the first end-point device test(s). For example, a security screen indicating that one or more files are vulnerable may result in the given end-point device being updated to include additional protections to the vulnerable file(s).

The given end-point device may also be updated. For example, the end-point device may receive a patch. The patch may be any modification to existing code, replacement of existing code, and/or new code that may be used by an end-point device during one or more operations. The patch may be specific to one or more programs and/or related to device system operations. The patch may be specific to a single end-point device (e.g., customized for the specific end-point device based on the operations herein) or the patch may be pushed to multiple end-point devices (e.g., a vulnerable program found as discussed herein may cause a patch to be pushed to other end-point devices that also use the given program).

In various embodiments, the patch may be applied to the end-point device by the end-point device (e.g., automatically or manually by a user associated with the end-point device). Additionally or alternatively, the patch may be applied remotely. The patch may be applied by updating code associated with the given end-point device.

In various embodiments, one or more end-point device tests for a given end-point device may be executed again once the given end-point device is executed. For example, any tests that resulted in a failing individual validation rating may be reran to determine whether the update to the given end-point device was successful or every test may be reran to determine whether the update has any unexpected results. In some embodiments, the operations herein may be executed again upon updating the end-point device. For example, the end-point device configuration may be determined (e.g., either a fresh configuration may be determined or the system may determine whether there were any changes to the configuration due to the update), the test kit for the given end-point device may be determined again (e.g., either a fresh test kit or a determination of whether any new tests should be added to the test kit for the given end-point device), and the test(s) may be executed on the end-point device to determine the validation rating (e.g., to determine whether the update was successful).

Referring now to optional Block 314 of FIG. 3, the method includes determining one or more third end-point device tests to be executed on a third end-point device based on the first end-point device configuration and a third end-point device configuration of the third end-point device. As discussed herein, the operations discussed herein relating to a first end-point device may be applied to any end-point device on a network. As such, the first end-point device configuration and/or the test kit for the first end-point device may be used to determine one or more test kits for other end-point devices with similar configurations. In various embodiments, one or more end-point device configurations for one or more end-point devices may be used to determine tests to be performed on another end-point device (e.g., similar configurations may have similar tests). In various embodiments, multiple end-point device configurations may be analyzed (e.g., via the ML/AI model(s)) to determine similarities between the different configurations and the tests performed on each end-point device. For example, the same test may be performed on each end-point device that shares one or more common application or programs.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for automated security verification across network devices, the system comprising:

at least one non-transitory storage device containing instructions; and at least one processing device coupled to the at least one non-transitory storage device, wherein the at least one processing device, upon execution of the instructions, is configured to:

determine a first end-point device configuration of a first end-point device associated with a network, wherein the first end-point device configuration includes one or more first end-point device programs installed on the first end-point device;

determine, via a machine learning model, one or more first end-point device tests to be executed on the first end-point device based on the first end-point device configuration, wherein the one or more first end-point device tests is based on at least one of the one or more first end-point device programs installed on the first end-point device, wherein the one or more first end-point device tests executed from a test kit are determined based on an order of execution of the one or more first end-point device programs installed on the first end-point device;

cause an execution of at least one of the one or more first end-point device tests on the first end-point device, wherein the machine learning model is configured to vary parameters during each execution of cycles of the first end-point device tests; and determine a first end-point device validation rating based on the execution of the at least one of the one or more first end-point device tests on the first end-point device.

2. The system of claim 1, wherein the machine learning model determines the one or more first end-point device tests based on a weighing of the one or more first end-point device programs installed on the first end-point device.

3. The system of claim 1, wherein the at least one processing device, upon execution of the instructions, is configured to determine an execution priority for the one or more first end-point device tests, wherein the execution priority indicates an order of execution for the one or more first end-point device tests.

4. The system of claim 1, wherein the determination of the at least one of the one or more first end-point device tests is also based on a second end-point device configuration of a second end-point device, wherein the second end-point device configuration have at least one common program with the first end-point device configuration.

5. The system of claim 4, wherein the at least one processing device, upon execution of the instructions, is configured to determine one or more third end-point device tests to be executed on a third end-point device based on the first end-point device configuration and a third end-point device configuration of the third end-point device.

6. The system of claim 1, wherein at least one of the one or more first end-point device tests is determined based on a first end-point device security setting.

7. The system of claim 1, wherein the at least one processing device, upon execution of the instructions, is configured to update the first end-point device based on the first end-point device validation rating in an instance in which the first end-point device validation rating is below predetermined value, wherein updating the first end-point device comprises modifying at least one of the one or more first end-point device programs.

8. A computer program product for automated security verification across network devices, the computer program product comprising at least one non-transitory computer-readable medium having computer-readable program code portions embodied therein, the computer-readable program code portions comprising one or more executable portions configured to:

determine a first end-point device configuration of a first end-point device associated with a network, wherein the first end-point device configuration includes one or more first end-point device programs installed on the first end-point device;

determine, via a machine learning model, one or more first end-point device tests to be executed on the first end-point device based on the first end-point device configuration, wherein the one or more first end-point device tests is based on at least one of the one or more first end-point device programs installed on the first end-point device, wherein the one or more first end-point device tests executed from a test kit are determined based on an order of execution of the one or more first end-point device programs installed on the first end-point device;

cause an execution of at least one of the one or more first end-point device tests on the first end-point device, wherein the machine learning model is configured to vary parameters during each execution of cycles of the first end-point device tests; and determine a first end-point device validation rating based on the execution of the at least one of the one or more first end-point device tests on the first end-point device.

9. The computer program product of claim 8, wherein the machine learning model determines the one or more first end-point device tests based on a weighing of the one or more first end-point device programs installed on the first end-point device.

10. The computer program product of claim 8, wherein the computer-readable program code portions comprising one or more executable portions are also configured to determine an execution priority for the one or more first end-point device tests, wherein the execution priority indicates an order of execution for the one or more first end-point device tests, and wherein the execution of the at least one of the one or more first end-point device tests is based on the execution priority.

11. The computer program product of claim 8, wherein the determination of the at least one of the one or more first end-point device tests is also based on a second end-point device configuration of a second end-point device, wherein the second end-point device configuration have at least one common program with the first end-point device configuration.

12. The computer program product of claim 11, wherein the computer-readable program code portions comprising one or more executable portions are also configured to determine one or more third end-point device tests to be executed on a third end-point device based on the first end-point device configuration and a third end-point device configuration of the third end-point device.

13. The computer program product of claim 8, wherein the computer-readable program code portions comprising one or more executable portions are also configured to update the first end-point device based on the first end-point device validation rating in an instance in which the first end-point device validation rating is below predetermined value, wherein updating the first end-point device comprises modifying at least one of the one or more first end-point device programs.

14. A method for automated security verification across network devices, the method comprising:

determining a first end-point device configuration of a first end-point device associated with a network, wherein the first end-point device configuration includes one or more first end-point device programs installed on the first end-point device;

determining, via a machine learning model, one or more first end-point device tests to be executed on the first end-point device based on the first end-point device configuration, wherein the one or more first end-point device tests is based on at least one of the one or more first end-point device programs installed on the first end-point device, wherein the one or more first end-point device tests executed from a test kit are determined based on an order of execution of the one or more first end-point device programs installed on the first end-point device;

causing an execution of at least one of the one or more first end-point device tests on the first end-point device, wherein the machine learning model is configured to vary parameters during each execution of cycles of the first end-point device tests; and determining a first end-point device validation rating based on the execution of the at least one of the one or more first end-point device tests on the first end-point device.

15. The method of claim 14, wherein the machine learning model determines the one or more first end-point device tests based on a weighing of the one or more first end-point device programs installed on the first end-point device.

16. The method of claim 14, further comprising determining an execution priority for the one or more first end-point device tests, wherein the execution priority indicates an order of execution for the one or more first end-point device tests, and wherein the execution of the at least one of the one or more first end-point device tests is based on the execution priority.

17. The method of claim 14, wherein the determination of the at least one of the one or more first end-point device tests is also based on a second end-point device configuration of a second end-point device, wherein the second end-point device configuration have at least one common program with the first end-point device configuration.

18. The method of claim 17, further comprising determining one or more third end-point device tests to be executed on a third end-point device based on the first end-point device configuration and a third end-point device configuration of the third end-point device.

19. The method of claim 14, further comprising updating the first end-point device based on the first end-point device validation rating in an instance in which the first end-point device validation rating is below predetermined value, wherein updating the first end-point device comprises modifying at least one of the one or more first end-point device programs.

* * * * *